United States Patent
Soldatos et al.

[15] 3,686,359
[45] Aug. 22, 1972

[54] CURABLE POLYEPOXIDE COMPOSITIONS

[72] Inventors: Anthony C. Soldatos, Kendall Park; Allison S. Burhans, West Millington, both of N.J.

[73] Assignee: Union Carbide Corporation, New York, N.Y.

[22] Filed: Dec. 19, 1969

[21] Appl. No.: 886,781

[52] U.S. Cl..........260/836, 117/124 E, 117/126 GE, 117/126 GR, 117/132 BE, 117/132 CB, 117/138.8 BE, 117/138.8 CB, 117/155 UA, 161/184, 161/185, 161/186, 260/32.8 EP, 260/37 EP, 260/78.4 EP, 260/831
[51] Int. Cl. .............................................C08g 45/04
[58] Field of Search..............................260/836, 837

[56] References Cited

UNITED STATES PATENTS

| | | | |
|---|---|---|---|
| 3,580,830 | 5/1971 | Siebert | 260/836 |
| 2,947,338 | 8/1960 | Reid | 260/836 |
| 3,100,160 | 8/1963 | Korpman | 260/836 |
| 3,135,716 | 6/1964 | Uraneck | 260/836 |
| 3,219,515 | 11/1965 | Rice | 260/837 |
| 3,312,754 | 4/1967 | Marks | 260/837 |
| 3,350,406 | 10/1967 | Meyer | 260/836 |
| 3,468,972 | 9/1969 | Hsieh | 260/836 |

OTHER PUBLICATIONS

McGarry, Frederick J. et al., Toughening of Glassy Crosslinked Polymers With Elastomeric Inclusions July 1, 1969, M.I.T. Publication.

*Primary Examiner*—Paul Lieberman
*Attorney*—Paul A. Rose, Aldo J. Cozzi and James C. Arvantes

[57] ABSTRACT

This application relates to curable compositions, based on cycloaliphatic epoxides in admixture with epoxy hardeners and polymers of butadiene, which can be cast into articles of desired configuration or used as binders in the preparation of laminates, and cured at elevated temperatures to form articles characterized by excellent physical properties such as tensile strength, toughness, resistivity to development and propagation of internal cracks, heat distortion temperatures and also characterized by excellent electrical properties.

19 Claims, No Drawings

CURABLE POLYEPOXIDE COMPOSITIONS

This invention relates to curable compositions based on cycloaliphatic epoxides in admixture with epoxy hardeners and polymers of butadiene; and cured products obtained therefrom. More particularly, this invention relates to curable compositions, as defined above, which can be cast into articles of desired configuration or used as binders in the preparation of laminates, and cured at elevated temperatures to form articles characterized by excellent physical properties such as tensile strength, toughness, resistivity to development and propagation of internal cracks, heat distortion temperatures and also characterized by excellent electrical properties. The compositions of this invention by virtue of the excellent properties find wide use as the matrix material or binder in the production of fiber reinforced laminates useful in such applications as printed electrical circuits, structural laminates and the like.

Curable compositions, as for example, curable compositions based on polyglycidyl ethers of polyhydric phenols, have found utility as compositions which can be cast into shaped articles of desired configuration and as compositions which can be used as the matrix material in the production of fiber reinforced laminates. It has been found, however, that articles and laminates produced from these compositions are subject to internal cracking when subjected to a dynamic load. In many instances the cracks propagate, and in time, there is a complete "failure" of the shaped article or of the laminate.

As a result of the "internal cracking" problem, various modifiers have been suggested as additives to compositions based on polyglycidyl ethers for the purpose of eliminating or suppressing the development and propagation of internal cracking. The addition of various modifiers to polyglycidyl ether compositions has not proved to be particularly desirable, however, as these modifiers tend to degrade other properties of these compositions, as for example, the tensile strength thereof.

The present invention provides curable epoxy compositions, based on cycloaliphatic epoxides in admixture with epoxy hardeners and polymers of butadiene, having excellent physical and electrical properties as previously described.

Suitable cycloaliphatic epoxides for purposes of this invention are those having an average of more than one vicinal epoxy group per molecule. The epoxy groups can be terminal epoxy groups or internal epoxy groups as exemplified by the cycloaliphatic epoxides which are subsequently described. Particularly desirable cycloaliphatic epoxides are the cyclohexane diepoxides, that is epoxides having at least one cyclohexane ring to which is attached at least one vicinal epoxy group.

Illustrative of suitable cycloaliphatic epoxides are the following:

FORMULA I

Diepoxides of cycloaliphatic esters of dicarboxylic acids having the formula:

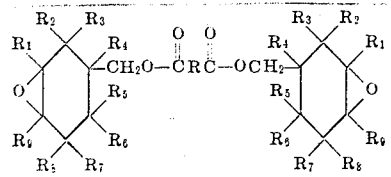

wherein $R_1$ through $R_9$, which can be the same or different are hydrogen or alkyl radicals generally containing one to nine carbon atoms inclusive and preferably containing one to three carbon atoms inclusive as for example methyl, ethyl, n-propyl, n-butyl, n-hexyl, 2-ethylhexyl, n-octyl, n-nonyl and the like; R is a valence bond or a divalent hydrocarbon radical generally containing one to nine carbon atoms inclusive and preferably containing four to six carbon atoms inclusive, as for example, alkylene radicals, such as trimethylene, tetramethylene, pentamethylene, hexamethylene, 2-ethylhexamethylene, octamethylene, nonamethylene, and the like; cycloaliphatic radicals, such as 1,4-cyclohexane, 1,3-cyclohexane, 1,2-cyclohexane, and the like.

Particularly desirable epoxides, falling within the scope of Formula I, are those wherein $R_1$ through $R_9$ are hydrogen and R is alkylene containing four to six carbon atoms.

Among specific diepoxides of cycloaliphatic esters of dicarboxylic acids are the following:
bis(3,4-epoxycyclohexylmethyl)oxalate,
bis(3,4-epoxycyclohexylmethyl)adipate,
bis(3,4-epoxy-6-methylcyclohexylmethyl)adipate,
bis(3,4-epoxycyclohexylmethyl)pimelate,
and the like. Other suitable compounds are described in U.S. Pat. No. 2,750,395 to B. Phillips et al.

FORMULA II

A 3,4-epoxycyclohexylmethyl 3,4-epoxycyclohexane carboxylate having the formula:

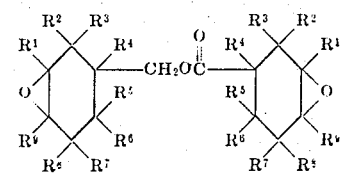

wherein $R^1$ through $R^9$ which can be the same or different are as defined for $R_1$ in Formula I. Particularly desirable compounds are those wherein $R^1$ through $R^9$ are hydrogen.

Among specific compounds falling within the scope of Formula II are the following: 3,4-epoxycyclohexylmethyl 3,4-epoxycyclohexanecarboxylate, 3,4-epoxy-1-methylcyclohexylmethyl 3,4-epoxy-1-methylcyclohexanecarboxylate, 6-methyl-3,4-epoxycyclohexylmethyl 6-methyl-3,4-epoxycyclohexanecarboxylate, 3,4-epoxy-3-methylcyclohexylmethyl 3,4-epoxy-3-methylcyclohexanecarboxylate, 3,4-epoxy-5-methylcyclohexylmethyl 3,4-epoxy-5-methylcyclohexanecarboxylate. Other suitable compounds are described in U.S. Pat. No. 2,890,194 to B. Phillips et al.

FORMULA III

Diepoxides having the formula:

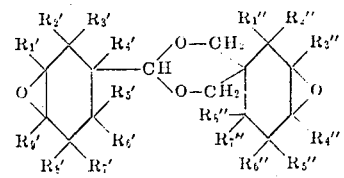

wherein the R single and double primes, which can be the same or different, are monovalent substituents such as hydrogen, halogen, i.e., chlorine, bromine, iodine or fluorine, or monovalent hydrocarbon radicals, or radicals as further defined in U.S. Pat. No. 3,318,822 to Hans Batzer et al. issued May 9, 1967. Particularly desirable compounds are those wherein all the R's are hydrogen.

Other suitable cycloaliphatic epoxides are

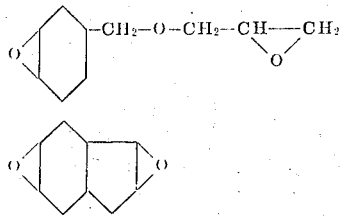

and the like

The hardeners which are suitable for purposes of this invention are compounds which undergo a reaction with the cycloaliphatic epoxides, as opposed to compounds which catalyze the self-reaction of the cycloaliphatic epoxides.

Among suitable hardeners which are admixed with the cycloaliphatic epoxides and polymers of butadiene to provide the curable compositions of this invention are the following:

1. phenolic hardeners having at least 2 phenolic hydroxyl groups and preferably having at least 3 phenolic hydroxyl groups per molecule.
2. polybasic acids having at least 2 carboxylic acid groups per molecule.
3. anhydrides of acids having at least 2 carboxylic acid groups per molecule.

Exemplary of suitable phenolic hardeners are the following polyhydric phenols: catechol, hydroquinone, hydroxyhydroquinone, phloroglucinol, resorcinol and pyrogallol; the di and polynuclear phenols such as the bisphenols described in Bender et al., U.S. Pat. No. 2,506,486 and polyphenylols such as novolac condensates of a phenol and a saturated or unsaturated aldehyde containing an average of from three to 20 or more phenylol groups per molecule (cf. book by T. S. Carswell entitled "Phenoplasts," published in 1947 by Interscience Publishers of New York).

Examples of suitable polyphenylols derived from a phenol and an unsaturated aldehyde such as acrolein are the triphenylols, pentaphenylols and heptaphenylols described in U.S. Pat. No. 2,885,385 to A. G. Farnham, issued May 5, 1959.

The phenols may contain alkyl or aryl ring substituents or halogens, as exemplified by the alkyl resorcinols, the tribromo resorcinol and the diphenols containing alkyl and halogen substituents on the aromatic ring (Bender et al., U.S. Pat. No. 2,506,486).

The polyhydric phenols can consist of two or more phenols connected by such groups as methylene, alkylene, ether, ketone, or sulfone. The connecting groups are further exemplified by the following compounds: bis(p-hydroxyphenyl)ether, bis(p-hydroxyphenyl)ketone, bis(p-hydroxyphenyl)methane, bis(p-hydroxyphenyl)dimethyl methane, bis(p-hydroxyphenyl)sulfone and the like.

For purposes of stoichiometric calculations with respect to phenolic hardeners, one phenolic hydroxyl group is deemed to react with one epoxy group.

Illustrative of suitable polybasic acids are the polycarboxylic acids of the formula:

FORMULA IV

wherein $f$ is an integer generally having a value of from 1 to 20 inclusive, as for example, malonic, succinic, glutaric, adipic, pimelic, suberic, azelaic, sebacic and the like. Other examples of suitable acids are phthalic acid, isophthalic acid, terephthalic acid and the like. Further acids are enumerated in U.S. Pat. No. 2,918,444 to B. Phillips et al., issued Dec. 22, 1959.

Among other suitable polybasic acids, having at least two carboxylic groups per molecule, can be noted the following: tricarballylic acid, trimellitic acid and the like. Other such suitable polybasic acids, including polyesters thereof, are described in U.S. Pat. No. 2,921,925 to B. Phillips et al.

Suitable anhydrides are the anhydrides of the acids listed above.

For purposes of stoichiometric calculations with respect to acids, one carboxyl group is deemed to react with one epoxy group; with respect to anhydrides, one anhydride group is deemed to react with one epoxy group.

Among other suitable hardeners are those such as dicyandiamide and the like.

Polymers of butadiene which are admixed with the cycloaliphatic epoxides and hardeners therefor to provide the compositions of this invention are carboxyl and mercapto containing poly(butadiene) and copolymers of butadiene and acrylonitrile wherein: the homopolymers and copolymers have a molecular weight of about 500 to about 15,000, preferably about 1,000 to about 10,000 and have an average of more than one terminal carboxyl or terminal mercapto group per molecule. As a general rule, the copolymers contain about 1 to about 99 percent by weight and preferably about 5 to about 50 percent by weight combined acrylonitrile.

Carboxyl and mercapto terminated polymers of butadiene as defined are further described in U.S. Pat. No. 3,135,716 to Carl A. Uraneck et al., patented June 2, 1964, U.S. Pat. No. 3,117,190 to Henry L. Hsieh, patented Apr. 6, 1965, and in U.S. Pat. No. 3,285,949 to A. R. Siebert, patented Nov. 15, 1966.

In formulating the compositions of this invention, the hardener, epoxide and polymer of butadiene are simply admixed at room temperature in a suitable container. As a rule the hardener is generally used in amounts of about 40 percent of stoichiometric to about 60 percent in excess of stoichiometric. It is preferred to use about 80 percent of stoichiometric to about stoichiometric amounts.

The polymer of butadiene is used in amounts of about 5 to about 250 parts by weight and preferably about 10 to about 100 parts by weight based on 100 parts by weight of the epoxide.

It is to be understood that other additives can be added to the compositions of this invention as is well known in the epoxy art. Among such additives are pigments such as carbon black and the like, accelerators such as ethylene glycol, tertiary amines and the like, fillers such a as clay, silica and the like.

The temperature to which the compositions of this invention are heated in order to effect a cure of the compositions will, of course, vary and depend, in part, upon the exact formulation of the compositions. As a rule, this temperature is in the range of about 100° C. to about 200° C. for a period of time ranging from about 1 to 6 hours.

As stated, the compositions of this invention can be formed into castings and used in applications wherein epoxy resins are generally utilized, for example, as electrical encapsulating material and the like.

In addition, the compositions of this invention find wide utility as binders in the preparation of laminates and filament-wound structures. In producing a composition suitable for this purpose, the composition if necessary is dissolved in any suitable organic solvent to form a solution having a solids content of about 30 to about 70 percent by weight. As a rule, the organic solvent used is a ketone, such as methylethyl ketone, diisopropyl ketone and the like. This solution is then used to impregnate, by any suitable method, for example, dipping, spraying and the like any desired material, for instance, glass cloth, glass filaments, carbon cloth, carbon filaments, nylon filaments, metal fibers, paper and the like. The impregnated material is then formed into a desired shape and the composition cured to its infusible state.

The disclosure of all references noted in the application, patents and otherwise are incorporated herein by reference.

The following examples further illustrate the present invention and are not intended to limit the scope thereof in any manner.

In the examples which follow, amounts are in parts by weight and the compositions were prepared by admixing the materials in a glass container at room temperature.

EXAMPLE 1

Compositions, the formulations of which are noted below, were prepared by admixing the components in a glass flask at room temperature and subjected to the tests, also noted below, after being cured to infusible products by being subjected to the following cure cycle:

2 hours at a temperature 120° C.
4 hours at a temperature 160° C.

The polyepoxide of this example was 3,4-epoxy-cyclohexylmethyl 3,4-epoxycyclohexane carboxylate having the formula:

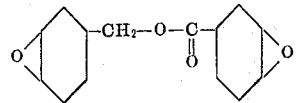

The carboxyl-terminated polymer of this example was a copolymer of acrylonitrile and butadiene-1,3. This copolymer had the following properties:

| | | |
|---|---|---|
| Carboxyl content, percent by weight | = | 2.37 |
| Terminal carboxyl functionality | = | 1.74 |
| Molecular weight | = | 3,270 |
| Combined acrylonitrile percent by weight | = | 19.4 |
| Viscosity at 27°C., in centipoises | = | 120,000 |
| Specific gravity 25°C/25°C | = | 0.948 |

The Gardner Impact Test was conducted by striking cured specimens — 0.1 inch thick by 2.0 inches in diameter unless otherwise noted — with a 4-pound round-nose rod. The energy required to fracture the specimen is expressed in inch.-lbs.

The boiling water test was conducted by immersing cured weighed specimens — ½ inch in diameter — in boiling water for 24 hours — wiping the specimens after the 24-hour period — cooling to room temperature and noting the change in weight if any.

EXAMPLE 2

This example illustrates the excellent bonding strength of the compositions of this invention.

Compositions, the formulations of which are noted below, were prepared as described in Example 1 and used, in each case, to bond together two pieces of aluminum specimens, the Lap Shear Strength of which was determined according to the procedure described in ASTM Test D-1002—64.

| | Compositions | |
|---|---|---|
| | Control 2 | H |
| Polyepoxide (Same as in Example 1) | 100 | 100 |
| Hexahydrophthalic acid anhydride | 100 | 100 |
| Ethylene glycol | 1.0 | 1.0 |
| N,N-dimethylbenzylamine | 1.5 | 1.5 |
| Carboxyl-terminated polymer (Same as in Example 1) | — | 10 |
| Lap Shear Strength, psi | | |
| at 73°F. | 1299 | 1625 |
| at 180°F. | 1138 | 1943 |
| at 250°F. | 1279 | 1780 |

| | Compositions | | | | | | | |
|---|---|---|---|---|---|---|---|---|
| | Control 1 | A | B | C | D | E | F | G |
| Polyepoxide | 100 | 100 | 100 | 100 | 100 | 100 | 100 | 100 |
| Hexahydrophthalic acid anhydride | 100 | 100 | 100 | 100 | 100 | 100 | 100 | 100 |
| Ethylene glycol | 1.5 | 1.5 | 1.5 | 1.5 | 1.5 | 1.5 | 1.5 | 1.5 |
| N,N-dimethylbenzylamine | 1.0 | 1.0 | 1.0 | 1.0 | 1.0 | 1.0 | 1.0 | 1.0 |
| Carboxyl-terminated polymer | 0 | 10 | 20 | 40 | 50 | 60 | 80 | 100 |
| Gardner impact—inch-lbs.: | | | | | | | | |
| At room temperature | 40 | 80 | 90 | 100 | *>320 | 120 | 130 | 168 | >320 |
| At −70° C | | | | | | 120 | | |
| Notched impact—ASTM D-256-56, ft.-lbs.-inch² | 0.22 | 0.28 | 0.45 | 0.48 | | | | |
| Tensile strength, ASTM D-638-64T, p.s.i | 7,500 | 12,000 | 10,600 | | | | | |
| Elongation, percent ASTM D-638-64T | 1.9 | 5 | 5.3 | 8 | 8.5 | | 20 | 30 |
| 24-hour water boil, percent increase in weight | 0.94 | 0.94 | 0.96 | 0.99 | | | | |

*Specimen was 0.5 inch thick.

EXAMPLE 3

Compositions, the formulations of which are noted below, were prepared as described in Example 1 and subjected to the test which is also noted below after being subjected to the following cure cycle:

2 hours at a temperature of 120° C.
4 hours at a temperature of 160° C.

|  | Control 3 | Compositions I | J | K |
|---|---|---|---|---|
| Polyepoxide (Same as in Example 1) | 100 | 100 | 100 | 100 |
| Hexahydrophthalic acid anhydride | 100 | 100 | 100 | 100 |
| Ethylene glycol | 1.5 | 1.5 | 1.5 | 1.5 |
| N,N-Dimethylbenzylamine | 1.0 | 1.0 | 1.0 | 1.0 |
| Carboxyl-terminated polymer (Same as in Example 1) | — | 10 | 20 | — |
| Carboxyl-terminated poly-(butadiene-1,3) | — | — | — | 10 |
| Heat distortion temperature in °C. | 191 | 187 | 188 | 188 |

The homopolymer had the following properties:

| Carboxyl content, percent by weight | = 3.0 |
|---|---|
| Terminal carboxyl functionality | = 1.90 |
| Molecular weight | = 3000 |
| Specific gravity 25°C/25°C | = 0.90 |

EXAMPLE 4

The composition, the formulation of which is noted below, was prepared as described in Example 1 and subjected to the tests noted below after being cured to an infusible product by being subjected to the following cure cycle:

2 hours at a temperature of 120° C.
4 hours at a temperature of 160° C.

|  | Composition L |
|---|---|
| Polyepoxide (Same as in Example 1) | 100 |
| Hexahydrophthalic acid anhydride | 100 |
| Ethylene glycol | 1.5 |
| N,N-dimethylbenzylamine | 1.0 |
| Mercapto-terminated polymer | 5 |
| Tensile Strength, psi ASTM D–638–64T | 9,600 |
| Elongation, percent ASTM D–638–64T | 3 |

The mercapto-terminated copolymer of this example was a copolymer of butadiene-1,3 and acrylonitrile, terminated with mercapto groups. This copolymer had the following properties:

| Mercapto content, percent by weight | = 3.10 |
|---|---|
| Terminal mercapto functionality | = 1.6 |
| Molecular weight | = 700 |
| Combined acrylonitrile percent by weight | = 24 |
| Specific gravity 25°C/25°C | = 0.98 |

EXAMPLE 5

The composition, the formulation of which is noted below, was prepared as described in Example 1 and subjected to the tests noted below after being cured to an infusible product by being subjected to the following cure cycle:

2 hours at a temperature of 120° C.
4 hours at a temperature of 160° C.

|  | Composition M |
|---|---|
| Polyepoxide (Same as in Example 1) | 100 |
| Hexahydrophthalic acid anhydride | 100 |
| Ethylene glycol | 1.5 |
| N,N-Dimethylbenzylamine | 1.0 |
| Carboxyl-terminated polybutadiene (Same as in Example 3) | 10 |
| Gardner Impact - Inch.-Lbs. | 70 |

EXAMPLE 6

This example illustrates the excellent electrical properties of the compositions of this invention.

Tests were conducted on the compositions noted in Example 1.

|  | Control 1 | Compositions A |  |
|---|---|---|---|
| Dielectric Srength-ASTM D-149-64 volts/mil | 440 | 435 | 434 |
| Dielectric Constant at 1 kc ASTM D-149-64 |  |  |  |
| 23°C. | 3.0 | 3.0 | 3.0 |
| 150°C. | 2.9 | 3.1 | 3.1 |
| Dissipation factor, 1 kc ASTM D–150–65T |  |  |  |
| 23°C. | .012 | .013 | .016 |
| 50°C. | .006 | .009 | .011 |
| 100°C. | .003 | .009 | .017 |
| 150°C. | .003 | .014 | .044 |
| 175°C. | .004 | .018 | .022 |
| Arc Resistance in sec. ASTM D– 49–561 | 195 | >208 | >250 |

EXAMPLE 6

In this example carboxyl-terminated copolymers of butadiene and acrylonitrile of various molecular weights were used to formulate compositions of this invention.

Compositions, the formulations of which are noted below, were prepared as described in Example 1 and subjected to the tests, also noted below after being subjected to the following cure cycle:

2 hours at a temperature of 120° C.
4 hours at a temperature of 160° C.

|  | Compositions M | N |
|---|---|---|
| Polyepoxide (Same as in Example 1) | 100 | 100 |
| hexahydrophthalic acid anhydride | 100 | 100 |
| Ethylene glycol | 1.5 | 1.5 |
| N,N-Dimethylbenzylamine | 1.0 | 1.0 |
| Carboxyl-terminated copolymer of butadiene-1,3 and acrylonitrile- molecular weight - 5800 Combined acrylonitrile - 19.5 percent by weight - terminal Carboxyl functionality - 1.7 | 10 | — |
| Carboxyl-terminated copolymer of butadiene-1,3 and acrylonitrile- molecular weight - 10,000 Combined acrylonitrile - 19 percent by weight - terminal carboxyl functionality - 1.78 | — | 10 |
| Tensile Strength, ASTM D–638–64T, psi | 11,000 | 10,800 |
| Elongation, percent, ASTM D–638–64T | 4.3 | 4.2 |
| Gardner Impact — Inch. — Lbs. | 50 | 60 |

EXAMPLE 7

This example shows that laminates prepared using the compositions of this invention as the matrix or binder material have excellent retention of strength under dynamic fatigue stressing.

Laminates were prepared using Control 1 and Composition A of Example 1.

Each composition was used as a laminating varnish by impregnating 181 weave glass cloth therewith, stacking 12 plies of impregnated cloth, one upon the other and subjecting the stacked plies to the following cure cycle:

1 hour at 120° C. — under a pressure of 200 psi
1 hour at 160° C. — under a pressure of 200 psi
5 hours at 160° C. — under a pressure of 200 psi The laminates were then tested under tensile stress using a Sonntag 1800 cpm Fatigue Testing Machine, Model SF-1-U.

At a 15,000 psi stress level the laminate based on Control 1 failed at 178,000 cycles.

At a 15,000 psi stress level the laminate based on Composition A did not fail until 490,000 cycles.

EXAMPLE 8

This example illustrates the excellent resistivity to development and propagation of internal cracks possessed by the compositions of this invention. This property is determined by plotting the tensile strength v. elongation of the composition tested, to obtain a Tensile Stress-Strain curve and calculating the area under the curve.

The compositions tested are those of Example 1 and are noted below:

| Composition | Tensile Strength | Elongation | Area Under Curve |
|---|---|---|---|
| Control 1 | 7,500 | 1.9 | 86 in.lb./in.$^3$ |
| Composition A | 12,000 | 5 | 382 in.lb./in.$^3$ |
| Composition B | 10,600 | 5.3 | 370 in.lb./in.$^3$ |
| Composition C | 9,390 | 8 | 458 in.lb./in.$^3$ |

The following epoxides were used in formulating compositions identical to those of Compositions A–D of Example 1 (with the exception of the epoxide) with similar results as to properties.

1.

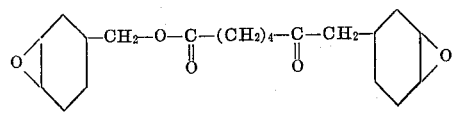

2.

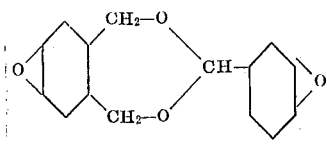

3.

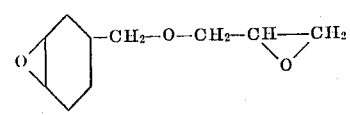

4.

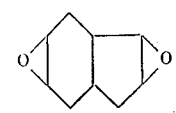

In order to further show the unique properties of the compositions of this invention, two compositions, Control 4 and Control 5, the formulations of which are noted below, were prepared in a manner as described for Example 1, subjected to a cure cycle and tested. Cure cycle, tests and results of the tests are noted below.

Cure cycle:
1.5 hours at 80° C.
1 hour at 90° C.
2 hours at 120° C.
4 hours at 160° C.

| | Compositions | |
|---|---|---|
| | Control 4 | Control 5 |
| Polyepoxide (Same as in Example 1) | 100 | 100 |
| Catalyst - boron trifluoride - Methylethyl amine complex | 6 | 6 |
| Carboxyl-terminated polymer (Same as in Example 1) | — | 30 |
| Gardner Impact — Inch.—Lbs. | 20 | 25 |
| Tensile Strength, ASTM D–638–64T, psi | — | 5,250 |

Also, the following hardeners were used in formulating compositions identical to those of Compositions A—D of Example 1 (with the exception of the anhydride hardener) with similar results as to properties:

1. — phenol-formaldehyde novolac having about four phenolic hydroxyl groups per molecule
2. — phthalic acid

What is claimed is:

1. A curable composition comprising a cycloaliphatic polyepoxide, a phenolic hardener, an acid hardener or an acid anhydride hardener therefore in an amount of about 40 percent of stoichiometric to about 60 percent in excess of stoichiometric and a polymer of butadiene which is a carboxyl containing poly(butadiene) or a copolymer of butadiene and acrylonitrile, said poly(butadiene) and copolymer having only terminal carboxyl groups in an average of more than one terminal carboxyl per molecule and being present in said composition in an amount of about 5 to about 250 parts by weight per 100 parts by weight of the said epoxide.

2. A curable composition as defined in claim 1 wherein the cycloaliphatic epoxide is a cyclohexane diepoxide.

3. A curable composition as defined in claim 1 wherein the cycloaliphatic epoxide has the formula:

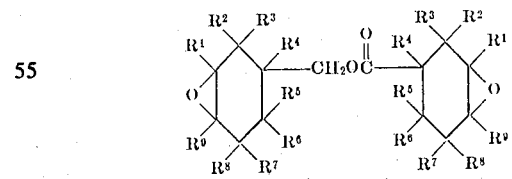

wherein $R_1$ through $R_9$ are hydrogen or alkyl radicals containing one to nine carbon atoms inclusive and R is a valence bond or a divalent hydrocarbon radical having one to nine carbon atoms inclusive.

4. A curable composition as defined in claim 3 wherein $R_1$ through $R_9$ are hydrogen and R is $(CH_2)_4$.

5. A curable composition as defined in claim 1 wherein the cycloaliphatic epoxide has the formula:

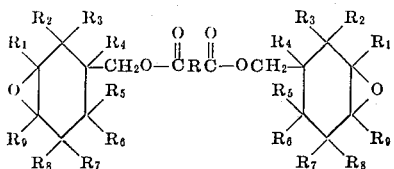

wherein R¹ through R⁹ are as defined for $R_1$ of claim 3.

6. A curable composition as defined in claim 5 wherein R¹ through R⁹ are hydrogen.

7. A curable composition as defined in claim 1 wherein the hardener is a phenolic epoxy hardener having at least two phenolic hydroxyl groups per molecule.

8. A curable composition as defined in claim 1 wherein the hardener is a polybasic acid having at least two carboxylic acid groups per molecule.

9. A curable composition as defined in claim 1 wherein the hardener is an anhydride of a polybasic acid.

10. A curable composition as defined in claim 9 wherein the anhydride is hexahydrophthalic acid anhydride.

11. A curable composition as defined in claim 1 wherein the butadiene polymer is a homopolymer of butadiene.

12. A curable composition as defined in claim 1 wherein the butadiene polymer is a copolymer of acrylonitrile and butadiene.

13. A curable composition as defined in claim 1 wherein the butadiene polymer has a molecular weight of about 500 to about 15,000.

14. A curable composition as defined in claim 1 wherein the butadiene polymer has a molecular weight of about 1,000 to about 10,000.

15. The cured product of the composition defined in claim 1.

16. A composition as defined in claim 1 comprising 3,4-epoxycyclohexylmethyl 3,4-epoxycyclohexane carboxylate, a homopolymer of butadiene and hexahydrophthalic acid anhydride.

17. A composition as defined in claim 1 comprising 3,4-epoxycyclohexylmethyl 3,4-epoxycyclohexane carboxylate, a copolymer of butadiene and acrylonitrile and hexahydrophthalic acid anhydride.

18. A curable composition as defined in claim 7 wherein the phenolic hardener is a phenol-formaldehyde novolac resin.

19. A curable composition as defined in claim 8 wherein the polybasic acid is phthalic acid.

* * * * *

UNITED STATES PATENT OFFICE
CERTIFICATE OF CORRECTION

Patent No. 3,686,359                     Dated August 22, 1972

Inventor(s) Anthony C. Soldatos and Allison S. Burhans

It is certified that error appears in the above-identified patent and that said Letters Patent are hereby corrected as shown below:

Column 10, lines 52-60, the formula should read as follows:

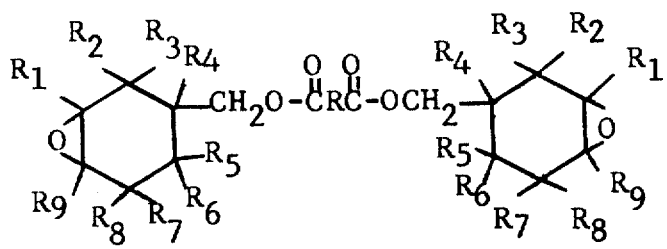

Column 11, lines 0-7, the formula should read as follows:

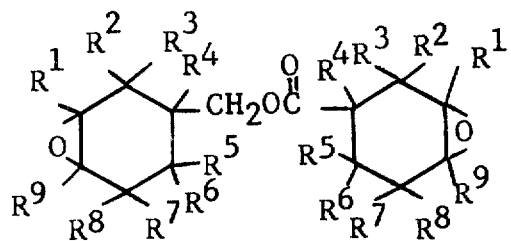

Signed and sealed this 9th day of January 1973.

(SEAL)
Attest:

EDWARD M. FLETCHER, JR.                  ROBERT GOTTSCHALK
Attesting Officer                        Commissioner of Patents